United State [11] 3,580,150

[72] Inventors John Thaxter Watson
 Wellesley Hills;
 Kenneth Robinson, Needham, Mass.
[21] Appl. No. 721,227
[22] Filed Apr. 15, 1968
[45] Patented May 25, 1971
[73] Assignee Itek Corporation
 Lexington, Mass.

[54] PANORAMIC CAMERA WITH FORWARD IMAGE MOTION COMPENSATION BY OPTICAL ROTATION OF IMAGE
 5 Claims, 4 Drawing Figs.
[52] U.S. Cl. .................................................. 95/12.5,
 352/106, 352/111
[51] Int. Cl. .................................................. G03b 29/00
[50] Field of Search .......................................... 352/105;
 95/12.5; 352/106, 107, 108, 109, 110, 111, 112

[56] References Cited
UNITED STATES PATENTS

| | | | |
|---|---|---|---|
| 3,143,732 | 8/1964 | Leighton | 95/12.5X |
| 3,259,448 | 7/1966 | Whitley | 352/119X |
| 3,463,070 | 8/1969 | Miller | 95/12.5X |

FOREIGN PATENTS

| | | | |
|---|---|---|---|
| 924,831 | 4/1947 | France | 352/106 |
| 1,164,302 | 5/1958 | France | 352/106 |

*Primary Examiner*—Samuel S. Matthews
*Assistant Examiner*—Monroe H. Hayes
*Attorneys*—Homer O. Blair, Robert L. Nathans, Lester S. Grodberg and Joseph S. Iandiorio ABSTRACT: Apparatus for compensating for forward image motion in panoramic cameras by rotating the image about the optic axis of the camera. In an aircraft camera a first scanning mirror is rotated relative to a second scanning mirror about their common axis in order to provide compensation for the forward motion of the plane.

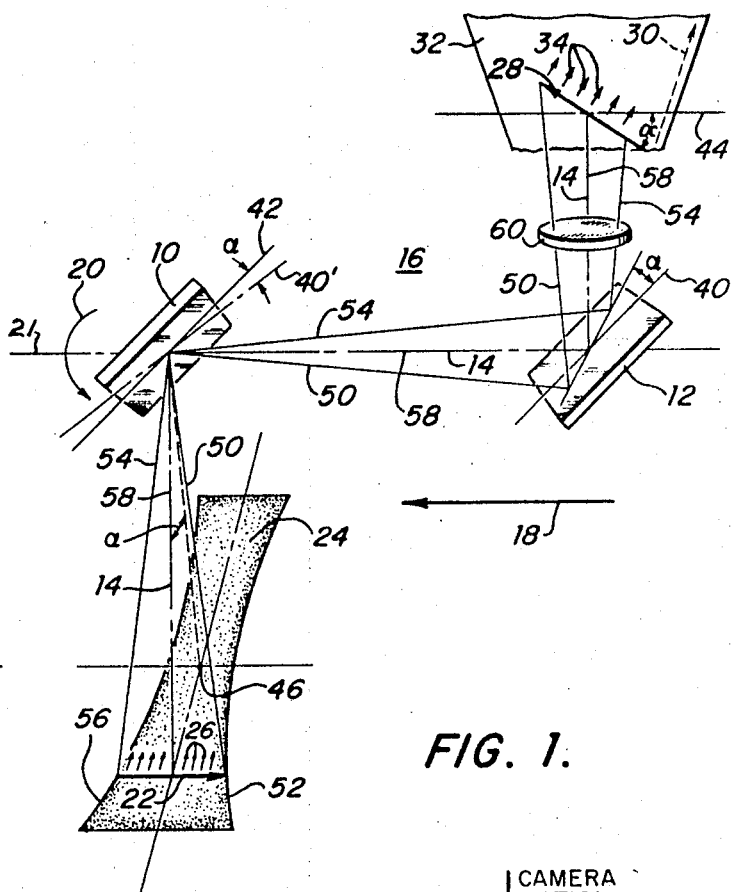
FIG. 1.
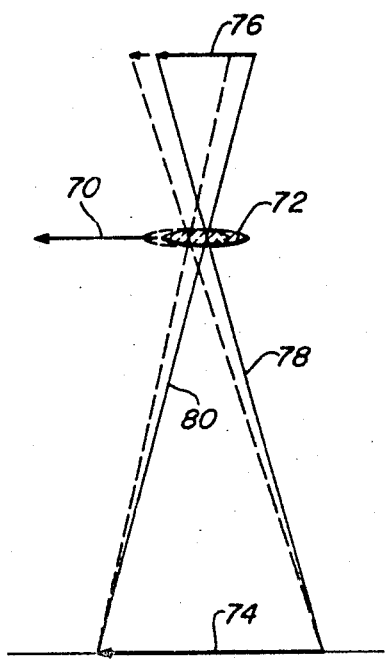
FIG. 3.
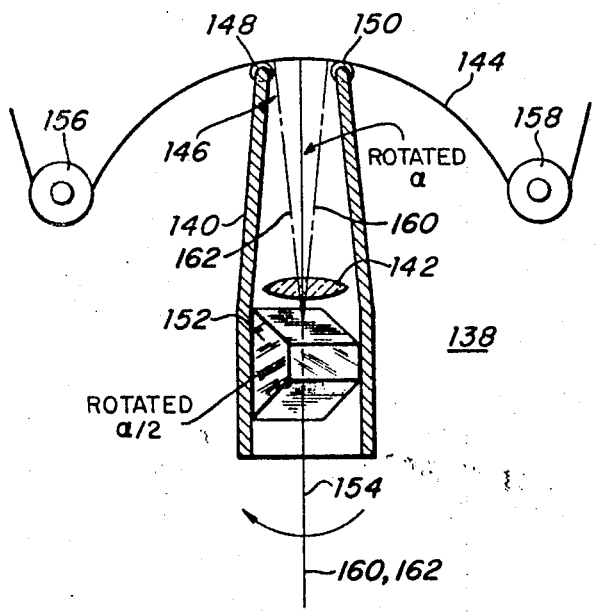
FIG. 4.
FIG. 2.
KENNETH ROBINSON
JOHN T. WATSON
INVENTOR.
BY
Joseph S. Iandiorio
ATTORNEY.

PANORAMIC CAMERA WITH FORWARD IMAGE MOTION COMPENSATION BY OPTICAL ROTATION OF IMAGE

CHARACTERIZATION OF INVENTION

The invention is characterized in apparatus for compensating for forward image motion in panoramic cameras comprising means for rotating the image about the optic axis of the camera to provide a component of scanning motion to compensate for the forward image motion at the film.

BACKGROUND OF INVENTION

This invention relates to apparatus for compensating for forward image motion in panoramic cameras.

Forward image motion is that motion of the image at the film which results from the action of a moving camera photographing a stationary object. As the camera moves forward with respect to a fixed object the image moves forward on the film. This results in an undesirable blurring of the photographic image.

Many attempts have been made to compensate for this image motion, often by the use of complex and expensive mechanisms providing an additional motion which compensates for the image motion across the film. That additional compensating motion has been supplied by moving the film forward at approximately the velocity of the forward image motion so that the relative motion between film and image is minimized or at least reduced to within acceptable tolerances. The additional compensating motion has also been generated by moving the scanning mechanism or lens backwards, i.e. in the opposite direction to the camera motion to reduce the relative motion between film and image.

SUMMARY OF INVENTION

Thus it is desirable to have available apparatus for optically compensating for forward image motion in panoramic cameras.

It is also desirable to have available such apparatus for providing such compensation by rotating the image about the optic axis of the camera.

It is also desirable to have available such apparatus which requires no additional differential motion between camera components to provide the compensation.

It is also desirable to have available such apparatus which employs a radiation deflection means positioned along the optic axis and permanently offset, by rotation about the optic axis.

It is also desirable to have available such apparatus usable in optical bar and direct scanning types of panoramic cameras.

The invention may be accomplished by optical means such as a Pechan prism or a pair of mirrors in the optic axis which effects a rotation of the image about the optic axis of the camera.

DISCLOSURE OF PREFERRED EMBODIMENTS

Other objects, features and advantages will occur from the following description of preferred embodiments and the accompanying drawings, in which:

FIG. 1 is a diagrammatic perspective view of a portion of an optical bar-type of panoramic camera including image rotating apparatus according to this invention;

FIG. 2 is a diagram of components of motion of the image at the film produced by the rotated image;

FIG. 3 is a diagram showing the cause of forward image motion in moving cameras;

FIG. 4 is a diagram of a direct scanning panoramic camera including an image rotation means according to this invention.

One embodiment of the invention uses a pair of reflection elements, mirrors 10 and 12, to rotate the image in the azimuth about the optic axis 14, FIG. 1. As the camera, indicated generally at 16, moves forward, arrow 18, over the area of interest, mirrors 10 and 12 are rotated as a unit, in the direction of arrow 20, about scanning axis 21 to perform the scan. Scanning from foreground to background in FIG. 1 object 22 on format 24 is given a relative motion indicated by arrows 26 in the direction of scan. The image 28 of object 22 ordinarily would have a parallel but oppositely directed, arrow 30, relative motion over the cylindrically disposed film 32, only a portion of which is shown, from background to foreground in FIG. 1.

However, because the image is rotated about optic axis 14, the relative motion of image 28 is as shown by arrows 34, not as shown by arrow 30. The rotation of the image 28 by an amount $\alpha$ is accomplished by rotating mirrors 10 and 12 through angle $\alpha$ relative to each other about optic axis 14. The relative rotational displacement $\alpha$ between mirrors 10 and 12 may be seen by the superimposition of a duplication 40' of center line 40 of mirror 12 on center line 42 of mirror 10. The angular displacement between mirrors 10 and 12 is a permanent offset maintained throughout every scanning operation. Once set, at assembly of the camera, it need not be changed. The offset is also apparent, FIG. 1, in that mirror 12 is facing straight up on a normal to the ground toward the center line 44 of film 32, whereas mirror 10 is not facing straight down at the nadir 46 but off to one side at object 22 and the angular displacement between nadir and object is $\alpha$.

The description of the rotation of the image as being a rotation in the azimuth is meant to distinguish it from a rotation of the image from left to right or fore and aft. The description is not necessarily a literal one. For during parts of the scan when the optic axis of the image rotating means is not normal to the ground, the rotation of the image is not actually taking place in the azimuthal plane but the azimuthal position of the image is being rotated, as is apparent by its rotation at the film.

An understanding of the rotation of the image produced by the rotational offset of mirrors 10 and 12 may be had by tracing the paths of the light rays from object 22 to image 28, FIG. 1. Forward ray 50 from object 22 at the forward edge 52 of format 24 is reflected to the lower portion of mirror 12 by mirror 10 as is expected but at the near lower portion of mirror 12 because of the rotational displacement between mirrors 10 and 12. Rear ray 54 from object 22 at the rear edge 56 of format 24 is reflected to the upper portion of mirror 12 as expected, but at the far upper portion of mirror 12 because of the rotational displacement between mirrors 10 and 12. Central ray 58 coincident with optic axis 14 is reflected unaffected by the rotational displacement between mirrors 10 and 12. Thus image 28, when it finally reaches film 32, is rotated about optic axis 14. Instead of being inverted but parallel to object 22, image 28 is slightly turned as a result of varied incidence of rays 50, 54, and 58 on mirror 12. However, although image 28 is rotated and has a relative motion which is nonparallel to the scan motion, the scan motion direction has not changed, the image is still being swept onto film 32 from background to foreground parallel to the scan on the ground but oppositely directed. Lens 60 represents the lens or lens system of the camera and may be placed elsewhere on optic axis 14, for example between mirrors 10 and 12.

The manner in which a rotation of the image may be made to compensate for forward image motion may be understood with reference to FIG. 2 where forward camera motion is indicated by arrow 62 and forward image motion by arrow 64. Film 32' is exposed to the image by light through slit 65 between elements 66 and 68; on the other side of each of elements 66 and 68 no light reaches film 32'. Forward image motion 64 is caused by the motion, arrow 70, of the camera, lens 72, FIG. 3, over the ground as it photographs the object 74 on the ground. The forward motion of the image 76 is apparent by the shifting, dashed lines, of rearward ray 78 and forward ray 80, and image 76 as lens 72 moves forward.

Because of the rotation of the image, the image motion is not confined to motion across slit 65 and film 32' in a direction, arrow 82, parallel to the scan on the ground or the cross-track axis 84 of film 32' as normally would be the case.

Rather, the image has a motion across slit 65 in the direction of vector 86. Vector 86 may be resolved into an along-track component 90 and cross-track component 92. Component 92 is parallel to the scan over the ground. Component 90 is parallel to the forward image motion but in the opposite direction. Since the forward image motion 64 and component 90 are in opposite directions, component 90 may be used to cancel or minimize the forward image motion, and to do so without any additional mechanisms or differential motions between parts of the camera.

The scanning plane need not be perpendicular to the ground as is shown in FIG. 1, but may be slanted in order to perform an oblique scan as is often desirable when the photographs are to be viewed in stereo apparatus.

In the embodiment discussed in FIG. 1 the optical axis 14 and the axis of rotation of the scanning mechanism are coincident: this is not necessary for the invention. The mirrors 10 and 12 may be displaced equally in the same direction from the scanning axis so that the optic axis is parallel to but not coincident with the scanning axis, or may be displaced unequally or in different directions, or both, from the scanning axis so that the optic axis is skew to the scanning axis.

The term scanning mechanism as used herein includes all parts of the optical system between the object and the image including the image rotating means. The image rotating means, such as the mirrors 10 and 12 need not perform the scanning function of the camera but may be used only for rotation of the image as in the case of the nodal point scanning type of panoramic camera.

The rotation of the image may be accomplished anywhere along the optic axis. Further, the rotation is a fixed rotation about the optic axis, not one that changes during scanning or between scans. The distinction between the fixed rotation of the image rotating means about the optic axis and the ability of the image rotating means to rotate with the optic axis is demonstrated in FIG. 1. There the image rotating means, mirrors 10 and 12, because the optic path between them, i.e. optic axis 14, is coincident with the axis of scan rotation, rotate with the optic axis 14. That is, mirrors 10 and 12, lens 60, and optic axis 14 from object 22 to mirror 10, between mirrors 10 and 12 and from mirror 12 to image 28, all rotate as a unit with the portion of the optic axis 14 which is coincident with the scanning axis. All parts of the scanning mechanism and its optic axis rotate as one. This rotation provides the scan but does not produce rotation of the image: it is the rotational offset between mirrors 10 and 12, in FIG. 1, about the optic path between them that produces the rotation of the image in the azimuth about the optic axis. The invention is applicable to all panoramic cameras whether nodal point scanning-type or otherwise, tilted or vertical.

The embodiment of FIG. 1 involves using reflection means to rotate the image in the azimuth in a camera structure similar to that of an optical-bar type panoramic camera. Other deflection means for rotating the image may also be used in that type of camera or in other types.

In a direct scanning camera 138, for example, FIG. 4, the rotation of enclosure 140 performs the scan of the ground and lens 142 focuses the image on cylindrically disposed film 144 through slit 146 formed between rollers 148 and 150. Prior to reaching lens 142, the image is reversed in the forward direction and is rotated through an angle $\alpha$ about optic axis 154 by either a Pechan or a Dove prism 152 rotated $\alpha/2$ about the optic axis 154 so that the image presented at film 144 is rotated and possesses a component of motion similar to component 90, FIG. 2, to compensate for forward image motion. The rotation through angle $\alpha$ can be seen by the fact that rays 160, 162 which are aligned with optical axis 154 below prism 152 are both visible above prism 152 after the rotation of the image about optic axis 154. Generally in such cameras film 144 is stationary during scanning and is driven to place a fresh length of film between rollers 156 and 158 after each scan.

The invention is not limited to the applications or embodiments disclosed here but is applicable to other types of panoramic cameras in which forward image motion occurs.

Other embodiments will occur to those skilled in the art and are within the following claims:

We claim:

1. In a panoramic camera including a first reflective member for scanning an area of interest and a second reflective member for receiving radiation from the first reflective member and projecting an image on the film of the camera the improvement in which one of said reflective members is offset by a predetermined fixed angle relative to the other about their common optic axis for rotating the image at the film about the optic axis a predetermined amount relative to the path of the image across the film to produce a component of image motion to compensate for forward image motion.

2. The camera of claim 1 in which said reflective members are mirrors.

3. In a panoramic camera including lens means rotatable about its nodal point for scanning an area of interest and projecting an image of that area onto the film of the camera the improvement comprising deflection means disposed in the optic axis of said lens means and rotated about the optic axis a predetermined amount relative to the path of the image across the film for rotating the image at the film about the optic axis by a predetermined angle relative to the path of the image across the film to produce a component of image motion to compensate for forward image motion.

4. The camera of claim 3 in which said deflection member is a Dove prism.

5. In a panoramic camera including optical scanning means for scanning an area of interest and projecting an image of said area onto a film in the camera the improvement comprising optical means disposed on the optic axis of said optical scanning means rotated and a predetermined amount about the optic axis relative to the path of the image across the film for rotating the image at the film about the optic axis by a predetermined angle relative to the path of the image across the film to produce a component of image motion to compensate for foreward image motion.